(12) United States Patent
Nada et al.

(10) Patent No.: US 6,681,543 B2
(45) Date of Patent: Jan. 27, 2004

(54) VEHICLE MOLDING AND METHOD FOR ATTACHING THE VEHICLE MOLDING

(75) Inventors: Sadao Nada, Nishikasugai-gun (JP); Daiichiro Kawashima, Nishikasugai-gun (JP); Tetsuya Miyano, Nishikasugai-gun (JP); Koichi Ogiso, Nishikasugai-gun (JP); Yasuo Shibuya, Nishikasugai-gun (JP); Takehiko Shiraki, Nishikasugai-gun (JP); Moriyoshi Takagi, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/105,279

(22) Filed: Mar. 26, 2002

(65) Prior Publication Data

US 2002/0139081 A1 Oct. 3, 2002

(30) Foreign Application Priority Data

Mar. 28, 2001 (JP) ........................ 2001-091999
Aug. 24, 2001 (JP) ........................ 2001-255071
Nov. 14, 2001 (JP) ........................ 2001-348782

(51) Int. Cl.⁷ ........................ E04C 2/38; B60R 19/42; B29C 65/00
(52) U.S. Cl. .................. 52/716.5; 52/716.6; 293/128; 264/249
(58) Field of Search .......................... 52/716.5, 716.6, 52/716.7; 293/128; 24/292, 297; 264/249

(56) References Cited

U.S. PATENT DOCUMENTS

| | | | | |
|---|---|---|---|---|
| 3,897,967 A | * | 8/1975 | Barenyi | 293/120 |
| 4,066,285 A | * | 1/1978 | Hall et al. | 293/120 |
| 4,765,036 A | * | 8/1988 | Iguchi et al. | 24/289 |
| 4,859,378 A | * | 8/1989 | Wolcott | 264/445 |
| 5,195,793 A | * | 3/1993 | Maki | 293/155 |
| 5,288,530 A | * | 2/1994 | Maki | 428/31 |
| 5,353,571 A | * | 10/1994 | Berdan et al. | 52/16.5 |
| 5,639,522 A | * | 6/1997 | Maki et al. | 428/31 |
| 5,669,731 A | * | 9/1997 | Hironaka et al. | 403/397 |
| 5,786,047 A | * | 7/1998 | Tomblin | 428/31 |
| 5,929,382 A | * | 7/1999 | Moore et al. | 174/72 TR |
| 6,177,155 B1 | * | 1/2001 | Kurosaki | 428/31 |
| 6,276,109 B1 | * | 8/2001 | Hingorani et al. | 52/716.5 |
| 6,279,974 B1 | * | 8/2001 | McCormack | 293/128 |
| 6,282,772 B1 | * | 9/2001 | McCormack | 29/458 |
| 6,296,470 B1 | * | 10/2001 | Lanser et al. | 425/508 |
| 6,308,488 B1 | * | 10/2001 | Hoshino | 52/716.5 |
| 6,354,623 B1 | * | 3/2002 | Delmastro | 280/732 |
| 6,372,311 B2 | * | 4/2002 | McCormack | 428/31 |

FOREIGN PATENT DOCUMENTS

| | | | |
|---|---|---|---|
| JP | 62-105741 | * | 5/1987 |
| JP | 06-278550 | | 10/1994 |
| JP | 11-247810 | | 9/1999 |

* cited by examiner

*Primary Examiner*—Carl D. Friedman
*Assistant Examiner*—Kevin McDermott
(74) *Attorney, Agent, or Firm*—Posz & Bethards, PLC

(57) ABSTRACT

A reinforcement rib is provided at the reverse side of the elongated side molding in longitudinal direction and a portion of the reinforcement rib is elevated to form a welding rib.

In the clip as an attachment member, a rib hole is provided for inserting the welding rib therein and the open side of the rib hole from which the welding rib is projecting is formed with a larger bore. The side molding body is integrally formed with the attachment member by housing a dislocation preventing portion formed by heat riveting a tip end of the welding rib inserted into the rib hole of the attachment member. Thus integrated side molding with the attachment member is attached to the outer panel of the vehicle by the leg portion provided at the attachment member.

17 Claims, 10 Drawing Sheets

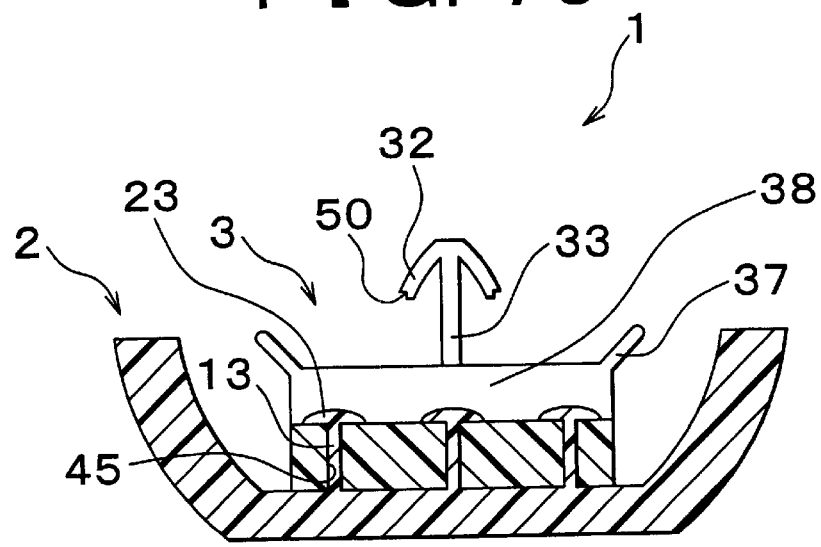
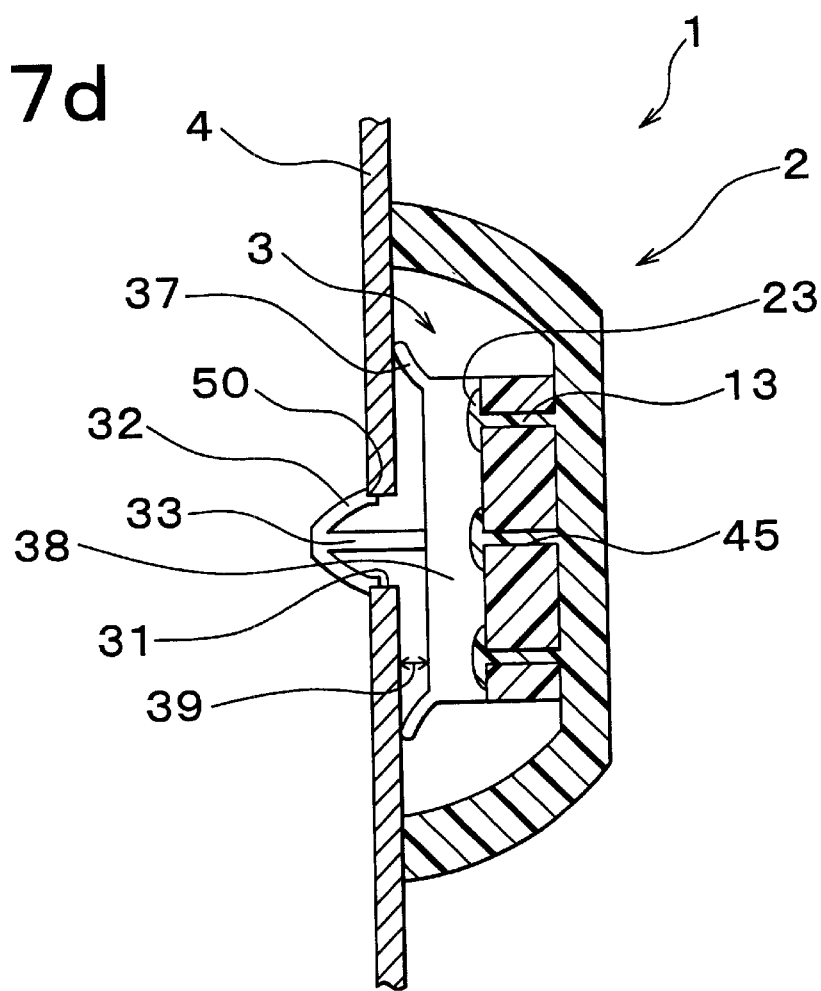

US 6,681,543 B2

1

VEHICLE MOLDING AND METHOD FOR ATTACHING THE VEHICLE MOLDING

INCORPORATION BY REFERENCE

The disclosure of Japanese Patent Application No. 2001-091999 filed on Mar. 28, 2001, No. 2001-255071 filed on Aug. 24, 2001 and No. 2001-348782 filed on Nov. 14, 2001 including the specification, drawings and abstracts are incorporated herein by reference in their entirety.

BACKGROUND OF THE INVENTION

1. Field of the Invention

The invention relates to a vehicle molding and method for attaching the vehicle molding to a vehicle body panel through a clip and the structure of the molding.

2. Description of the Related Art

A vehicle molding as a related art of the invention is well known which is decoratively attached to the vehicle body panel such as a vehicle side door and protects the body panel. As one of the attachment methods of the molding body to the body panel, a clip is used as an attaching member to attach the molding to the vehicle body panel.

In this attachment method, each opposing surface of the clip and the vehicle molding body has an engaging portion for engagement of both clip and the molding body. At these engaging portions, the clip and the vehicle molding body are engaged with each other so that the clip is integrally formed on the vehicle molding body. Then the clip is engaged with the body panel and the molding body is attached to the vehicle body panel.

It is necessary for the above attachment method to provide a sufficient thickness at each engaging portion of the clip and the body panel. In case of a structure of a molding having a thin thickness from the outer surface to the inner surface, it may be difficult to achieve the attachment according to the above method.

Further, in the above attachment method, it is necessary to provide an undercut portion in the mold for forming the molding body so that the engaging portion of the molding body can be formed. It takes time to form the molding body due to the necessity of providing such undercut portion. In order to separate the molded product from the undercut portion of the mold, the mold device for the vehicle molding body becomes very complicated.

SUMMARY OF THE INVENTION

Considering the above conventional problems, the invention provides a vehicle molding and method for attaching the vehicle molding, wherein the vehicle molding is easy to be formed and even a vehicle molding with thinner thickness can be attached to the vehicle body panel.

In order to achieve the above purpose, a vehicle molding according to one aspect of the invention includes an elongated molding body with a recessed portion (concave portion) at a portion opposing to the body panel and having a welding rib in the concave portion, and an attachment member provided in the concave portion of the molding body and having a rib hole for inserting the welding rib.

Attachment of the vehicle molding to the vehicle body according to the invention is achieved as follows:

The engagement portion formed on the attachment member attached to the molding body is engaged with the hole opening to the body panel to attach the molding to the vehicle body.

2

BRIEF DESCRIPTION OF THE DRAWINGS

FIG. 7c is similar to FIG. 7b, but showing the condition after the heat clinching portion is formed according to the second embodiment;

FIG. 7d is a cross sectional view of the vehicle attached with the side molding viewed from the front of the vehicle according to the second embodiment;

DETAILED DESCRIPTION OF THE PREFERRED EMBODIMENTS

Preferred embodiments of an attachment of the side molding will be explained hereinafter.

(First Embodiment)

Figure 1:
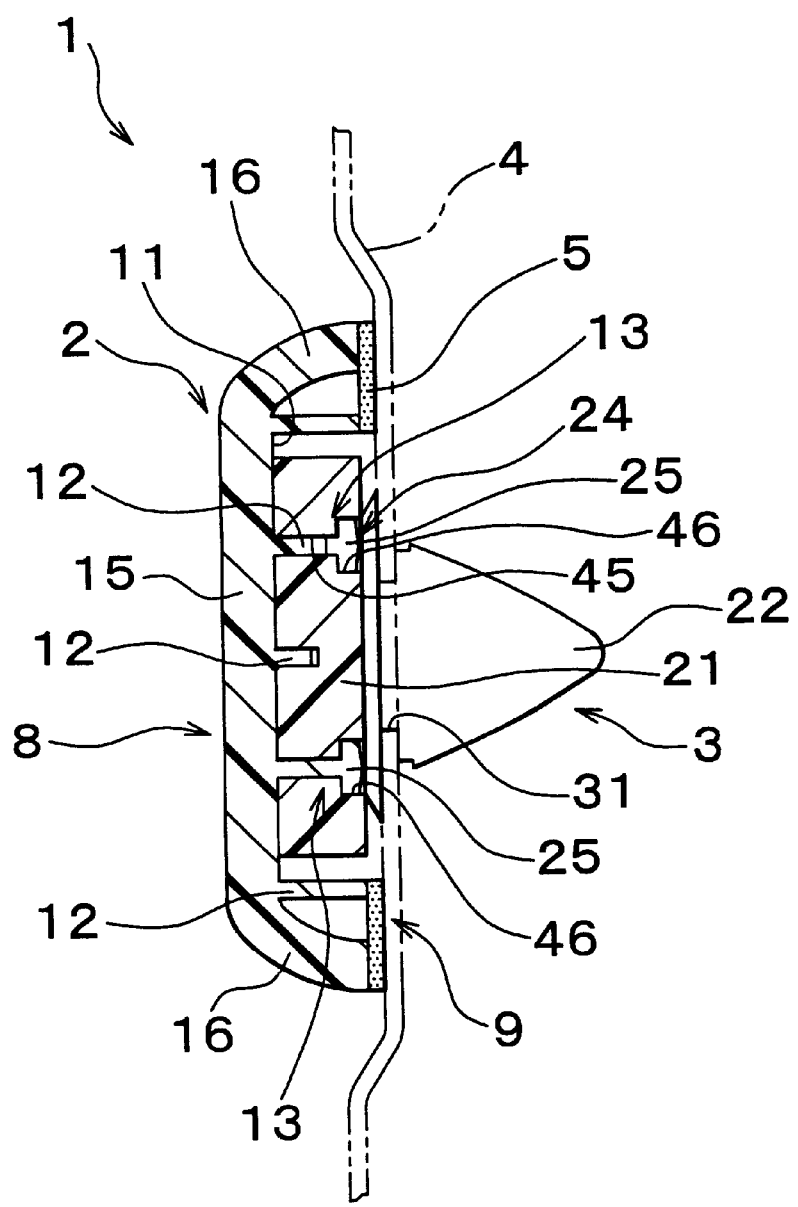
FIG. 1 shows an explanatory sectional view of an attachment structure of a side molding according to a first embodiment of the present invention.

As shown in FIG. 1, the attachment structure of the vehicle molding according to the first embodiment includes a vehicle molding 1 attached to a body panel 4 through a clip 3 as an attachment member.

The above vehicle molding 1 includes a recess 11 formed on the reverse side 9 opposing to the body panel 4 and a plurality of reinforcement ribs 12 provided in the recess 11 and extending therefrom, and a plurality of welding ribs 13 formed by elevating a portion of each reinforcement rib 12.

The clip 3 has a plate portion 21 and a leg portion 22. The plate portion 21 includes rib holes 45 for inserting therein the welding ribs 13. The leg portion 22 is engaged with an engaging hole 31 provided on the body panel 4. According to the first embodiment, the clip 3 includes concave shape bores 46 at the rib hole 45 as a spot facing.

In the attachment structure of the vehicle molding 1, the welding ribs 13 are inserted into the rib holes 45. The plate portion 21 is provided in the recess 11. According to the first embodiment, the clip 3 and the vehicle molding 1 are formed integrally by housing a dislocation preventing portion 25 formed on the tip end 24 of each welding rib 13 inside of the concave shape bores 46.

The vehicle molding 1 is attached to the body panel 4 by the engagement of the leg portion 22 of the clip 3 with an engaging hole 31 of the body panel 4.

The procedure of assembling of the side molding 2 and the clip 3 and the procedure of the attachment the side molding 2 and the clip 3 to the body panel 4 will be explained in detail hereinafter.

Figure 2:
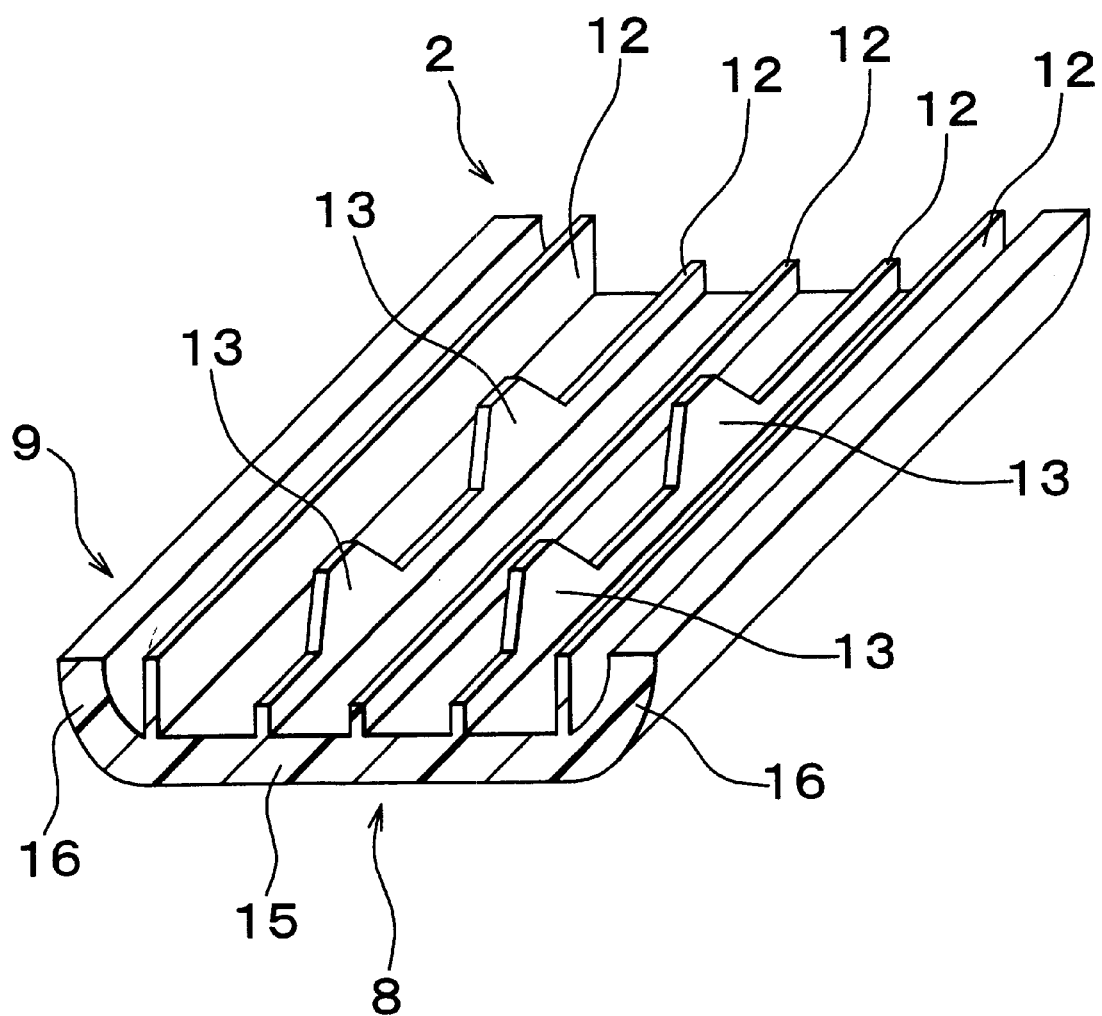
FIG. 2 is a perspective view of a side molding body according to the first embodiment.

As shown in FIG. 2, according to the first embodiment, the vehicle molding 1 is a side molding to be attached to a side door of the vehicle. The side molding body 2 is formed by a body portion 15 and a projection 16 formed at both ends of the body portion 15 in width direction. The plurality of the reinforcement ribs 12 are formed along the longitudinal direction of the side molding body 2 over the entire length. In the first embodiment, the number of the reinforcement rib 12 is five and two of the ribs 12 positioned at the outer ends are elevated higher than the inner three ribs. The welding ribs 13 are provided at the two reinforcement ribs 12 located at two both outer sides of the inner three ribs among the five reinforcement ribs 12.

Figure 3:
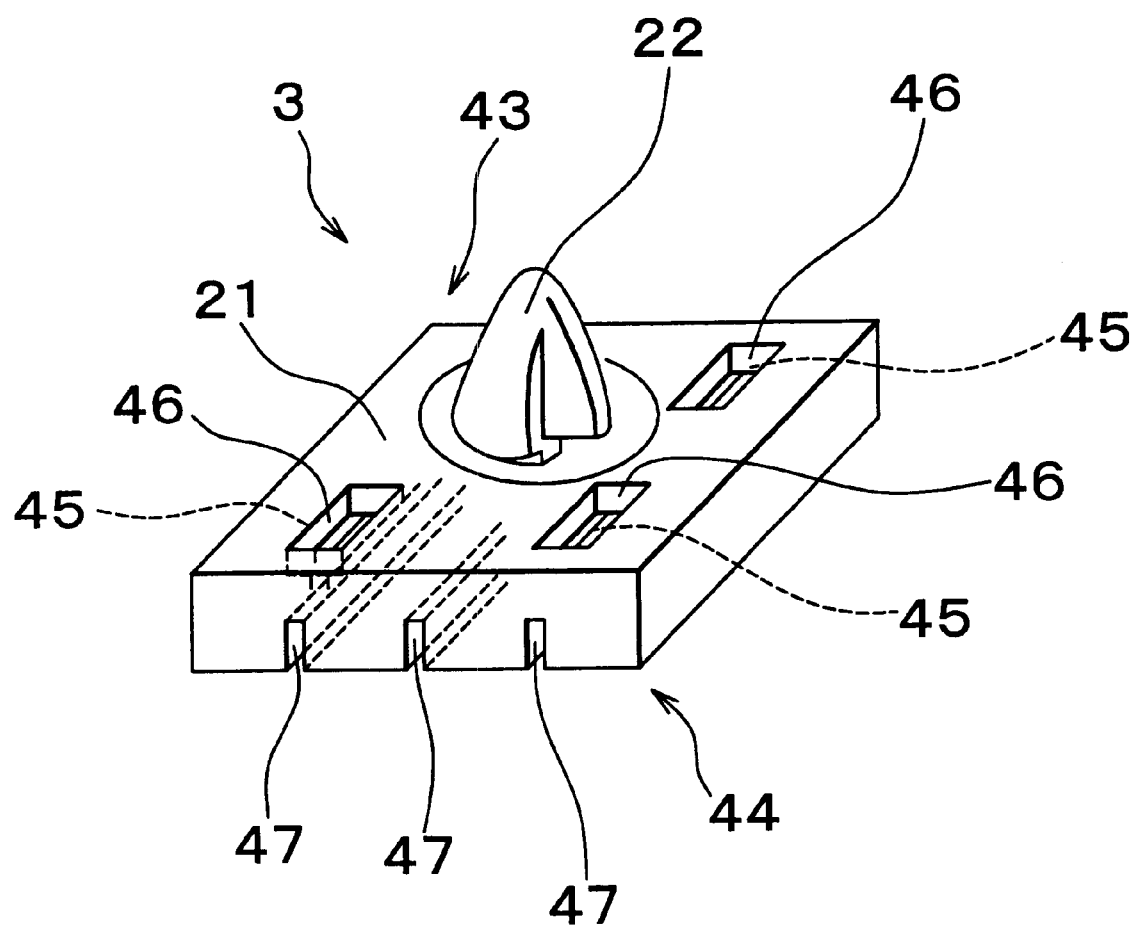
FIG. 3 is a perspective view of a clip as an attachment member according to the first embodiment.

As shown in FIG. 3, the clip 3 is provided with three grooves 47 for the reinforcement ribs at a reverse surface 44 opposing the side molding body 2. The two concave shape bores 46 of the plate portion 21 are formed around the rib holes 45 penetrating from the reinforcement rib grooves 47 located at both outer sides among the three grooves on an outer surface 43 opposing the body panel 4. The leg portion 22 of the clip 3 is provided at approximately center of the outer surface 43 side of the clip 3.

As shown in FIG. 1, under the clip 3 and the side molding body 2 being overlapped, the three reinforcement ribs 12 located at the inner side are inserted into the reinforcement grooves 47. In the first embodiment, a double coated adhesive tape 5 is adhered to the projections 16 formed at both ends of the side molding body 2 in width direction and the two reinforcement ribs 12 located at the outer side. The vehicle molding 1 is attached to the body panel 4 by engaging with the engaging hole 31 of the leg portion 22 of the clip 3 opened to the body panel 4 and adhered to the double coated adhesive tape 5. The plurality of the welding ribs 13 of the side molding body 2 are provided along the longitudinal direction of the side molding body 2. A plurality of clips 3 are provided along the side molding body 2, but only one is shown in the drawings.

Next, the attachment method of the clip 3 to the side molding body 2 will be explained with reference to FIGS. 4a to 4d. It should be noted here that the leg portions 22 are omitted from FIGS. 4a to 4d.

Figure 4A:
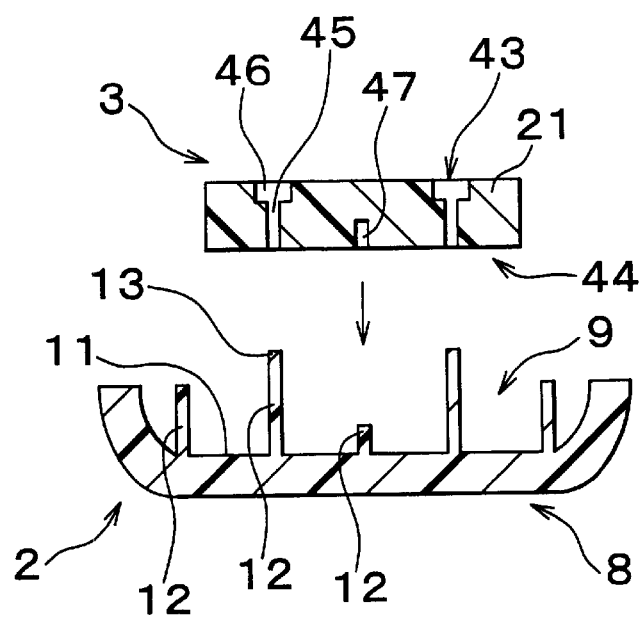
FIG. 4a is a cross sectional view showing the clip provided opposite to the side molding body by attachment method of the clip to the side molding body according to the first embodiment.
Figure 4B:
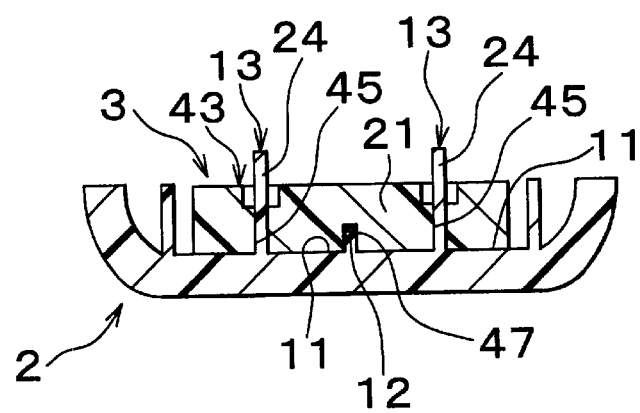
FIG. 4b is a similar to FIG. 4a but showing the clip provided on the side molding body.

As shown in FIG. 4a, the reverse side 44 of the side molding body 2 is positioned opposite to the reverse side surface 9 of the side molding body 2 upon assembling the clip 3 and the side molding body 2. Then as shown in FIG. 4b, the three inner side reinforcement ribs 12 of the side molding body 2 are inserted into the reinforcement rib grooves 47 of the clip 3 respectively and at the same time, the welding ribs 13 of the side molding body 2 are inserted into the rib holes 45. The welding ribs 13 are projected from an outer surface 201 of the clip 3. Thus the plate portion 21 of the clip 3 is positioned in the recess 11 of the side molding body 2.

Figure 4C:
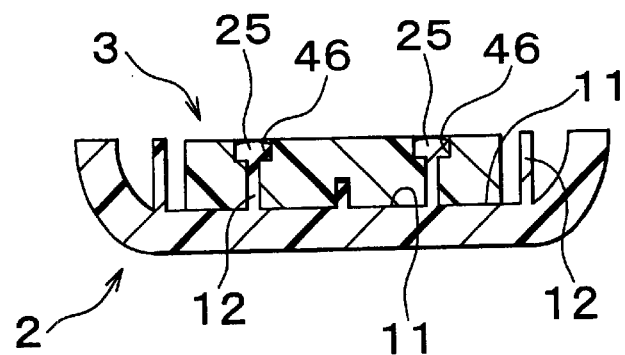
FIG. 4c is similar to FIG. 4b, but showing the clip and the side molding being integrally formed.

In FIG. 4c, the tip end 24 of the welding rib 13 is melted to be deformed. The dislocation preventing portion 25 which is larger than the size of the rib hole 45 in width direction, is formed in the bore 46 to be housed therein. Thus the bore formed by spot facing, prevents the dislocation preventing portion 25 from the unlimited melting and deformation.

Thus the clip 3 and the side molding body 2 are integrally formed. As shown in FIG. 2, the side molding body 2 includes the welding ribs 13 at the reverse side 9 before the integral forming of the clip 3 and the side molding body 2. However, the side molding body 2 does not include any engaging portion having undercut portions for engaging with the clip 3, which the conventional method had. Accordingly, there is no need to provide such undercut portion in the mold to form the side molding body 2. The forming equipment including mold is simple in structure and the forming of the side molding body 2 is easy to be carried out.

Further, as shown in FIG. 4b, in the first embodiment, when the clip 3 is arranged to the side molding body 2, the welding ribs 13 of the side molding body 2 are inserted into the rib holes 45 of the clip 3. The plate portion 21 of the clip 3 is arranged in the recess 11 of the side molding body 2, and after these arrangements, as shown in FIG. 4c, the tip end 24 of the welding rib 13 is melted to be deformed. Then the tip end 24 is formed to be the dislocation preventing portion 25 which is larger in size in width direction than the size of the rib hole 45 and positioned at the inside of the bore 46 to integrally form the clip 3 and the side molding body 2.

In other words, according to the attachment method of the side molding body 2 of the first embodiment, it is not necessary to provide an engaging portion such as undercut in the mold for forming the side molding body 2, and the clip 3 and the side molding body 2 can be integrally connected by engaging the clip with the side molding body 2 by melting and deformation without providing any undercut portion in the mold.

Accordingly, it is not necessary to thicken the size, which is necessary for the mold having such undercut portion for providing the engaging portion when the method of the first embodiment is applied. Accordingly, the attachment method of the first embodiment overcomes potential manufacturing difficulties, even when the the thickness of the side molding body 2 from the outer surface 8 side to the reverse surface 9 side is thin or the depth of the recess 11 of the side molding body 2 is shallow, by reducing the thickness of the plate portion 21 or forming the dislocation preventing portion 25 to be thinner.

As shown in FIG. 2, the side molding body 2 includes reinforcement ribs 12 projecting from the recess 11 on the reverse surface 9 side and the welding ribs 13 are formed to be elevated by forming inclination at the portion of the ribs 12. Accordingly, the welding ribs 13 are relatively gradually projected from the reinforcement ribs 12. The inclination can refrain the sudden shape change at the portion where the welding ribs 13 are formed during the forming of the side molding body 2. Upon the forming of the side molding body 2, when the forming material is introduced into the mold, the material can smoothly flow through the mold not to generate any dent on the outer surface 8 of the side molding body 2.

As shown in FIG. 1, the vehicle molding 1 is attached to the body panel 4 by engaging the leg portion 22 of the clip 3 with the engaging hole 31 of the body panel 4. The side molding body 2 is provided with reinforcement ribs 12 at the reverse side surface 9 of the side molding body 2 which strengthens the side molding body 2 against the deformation by such as torsion, bending and can be attached to the body panel 4 with a very high attachment strength.

Since the bores 46 are formed on the clip 3, the dislocation preventing portion 25 formed by the melting and deformation can be housed in the bores 46. Accordingly, the thickness of the plate portion 21 of the clip can be as same as the depth of the recess 11 of the side molding body 2 to realize the attachment structure of the vehicle molding 1. This form will enhance the strength of the plate portion 21 and the application to a more thinner vehicle molding 1 can be easy to be made.

Figure 5:
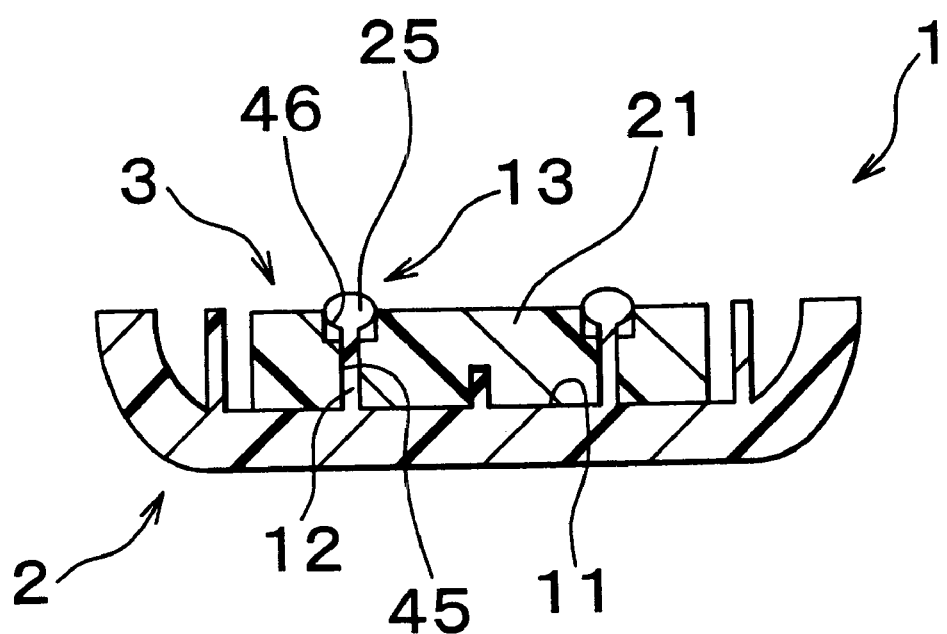
FIG. 5 is a cross sectional view of the clip and the side molding body integrally formed by providing a portion of a dislocation prevention portion within the inside of a bore according to the first embodiment.

According to the first embodiment, the entire dislocation preventing portion 25 is housed inside of the bore 46, however, as shown in FIG. 5, a part of the dislocation preventing portion 25 may be housed in the bore 46. Even in this case, the similar effects or advantages can be obtained.

(Second Embodiment)

Figure 6:
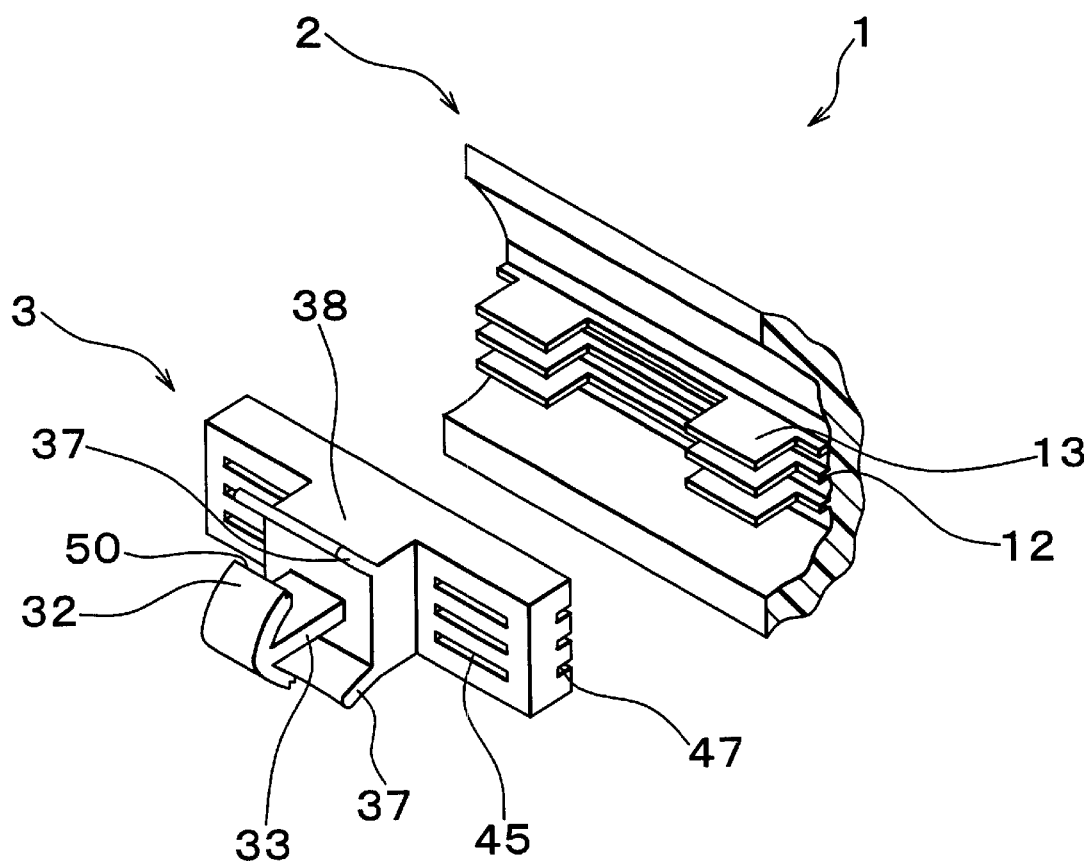
FIG. 6 is an exploded perspective view of the side molding body and the attachment member according to a second embodiment.

Another embodiment will be explained as a second embodiment with reference to FIGS. 6 through 10. First, the vehicle molding structure of the second embodiment will be explained. FIG. 6 is an exploded view of the rear end of the vehicle molding viewed from the vehicle advancing direction. The same structures or parts as the first embodiment are omitted from the explanation.

The side molding body 2 of the second embodiment has reinforcement ribs 12 arranged in three lines in longitudinal direction. The welding ribs 13 are of rectangular plate shape and arranged in two lines on the reinforcement ribs 12. The total number of the welding rib 13 is six provided on the reinforcement ribs 12.

On the other hand, the clip 3 is of rectangular parallelepiped shape and is projecting toward the body panel side at the center 38 of the clip 3. The clip 3 is provided with rib holes 45 at a position opposite to the welding ribs 13. The rib holes 45 are penetrating from the outer surface of the side molding side of the clip 3 through the outer surface side of the body panel. It should be noted here that the rib holes 45 are not provided with bores different from the one in the first embodiment. The penetration direction length of the rib holes 45, in other words, the thickness of the clip 3 is set to be smaller than the height of the welding ribs 13. The outer surface of the clip 3 is provided with an elastic engaging portion 33 with a prism shape. The tip end of the elastic engaging portion 33 is formed with an arrowhead shape return portion 32 and at the top of the return portion 32, a step 50 is provided. The elastic engaging portion 33 corresponds to the leg portion 22 of the first embodiment. At the upper end brim of the center 38 is provided a thin plate lip 37 extending upwardly in a slant and at the lower end brim of the center 38 is provided a thin plate lip 37 extending downwardly in a slant.

Figure 7A:
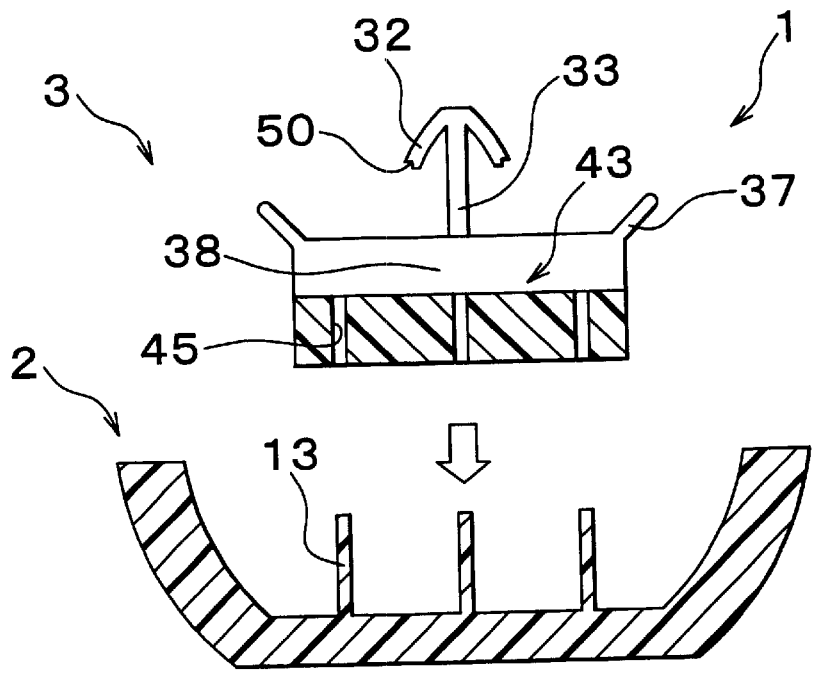
FIG. 7a is a cross sectional view of a heat clinched rib before inserting into a slit according to the second embodiment.
Figure 7B:
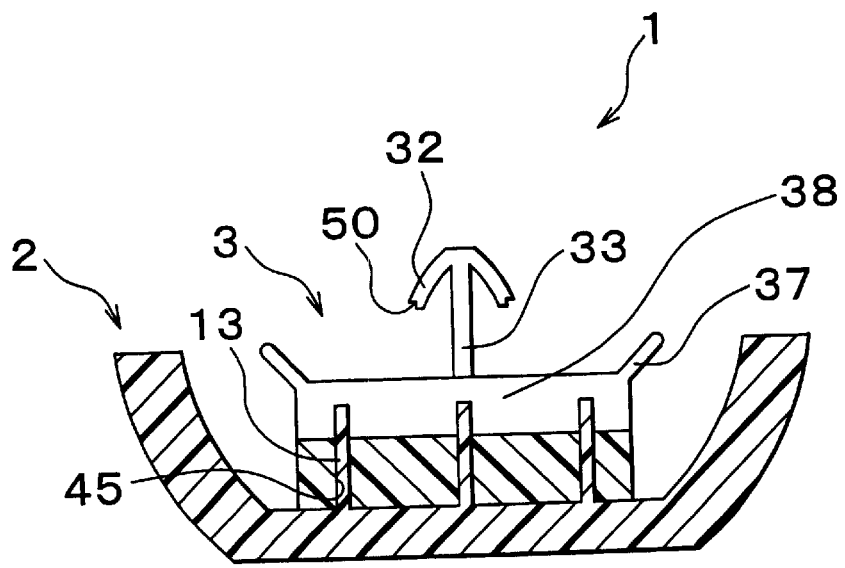
FIG. 7b is a cross sectional view of a heat clinched rib after inserted into a slit according to the second embodiment.

The attachment method of the side molding according to the second embodiment will be explained. In FIG. 7a, the welding ribs 13 are inserted into the rib holes 45 of the clip 3. The length of the hole 45 in inserting direction is set to be smaller than the height of the welding rib 13 and accordingly, the tip end of the welding rib 13 is projecting from the outer surface 201 of the clip 3. Then, the tip end of the projected welding rib 13 is contacted with the preheated staking tool (not shown) under pressure. When the tool is pressurized, the tip end of the rib 13 is heat-deformed to be crashed. Thus a heat riveting portion 23 is formed as shown in FIG. 7c.

The heat riveting portion 23 corresponds to the dislocation preventing portion 25 of the first embodiment. The heat riveting portion 23 extends in longitudinal direction relative to the side molding body 2 to restrict the bending deformation of the side molding body 2.

Next, the side molding body 2 integrally formed with the clip 3 is attached to the vehicle body panel 4 as shown in FIG. 7d. Upon attachment, the return 32 of the elastic engaging portion 33 is elastically deformed in the direction narrowing the arrow angle to be penetrating through the engaging hole 31. The return 32 after being penetrating the engaging hole 31, expands in radial direction and engages with the end brim of the engaging hole 31 at the step 50 formed at the tip end of the return 32. Thus the attachment of the side molding body 2 to the body panel 4 is carried out by the penetration of the elastic engaging portion 33 through the engaging hole 31.

It is necessary to allow some stroke 39 (shown with the arrow in FIG. 7d) for expanding deformation in radial direction of the return 32 after the penetration through the engaging hole 31. Since the stroke 39 is secured, the vehicle molding 1 may chatter after the side molding body 2 is attached to the body panel 4. Accordingly, a lip 37 is provided for restricting the chattering of the vehicle molding 1. The lip 37 biases the clip 3 in a direction for separating from the body panel 4. By the biasing force of the lip 37, the step 50 of the tip end of the return 32 pressurizes against the body panel 4, thus restricting the chattering of the vehicle molding 1 by the lip 37.

(Third Embodiment)

Figure 8:
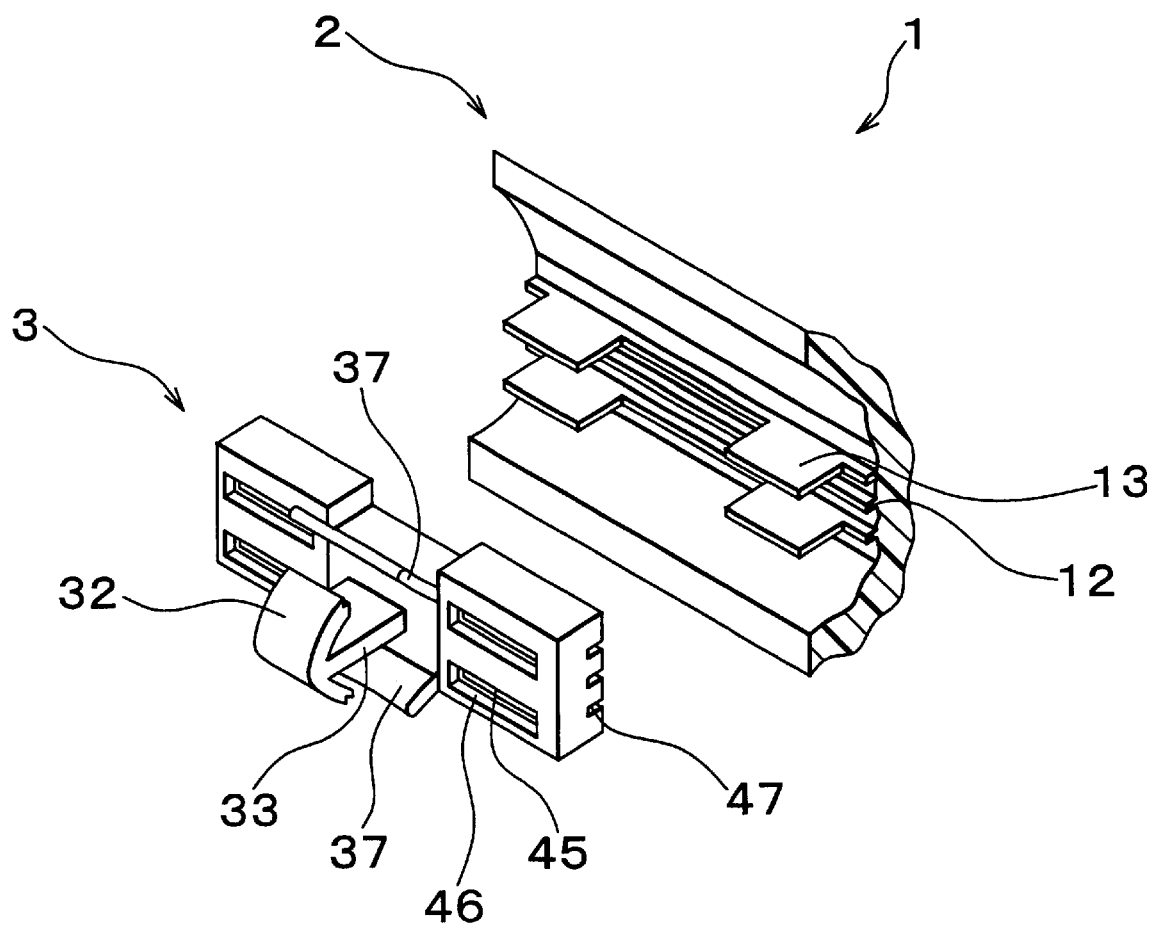
FIG. 8 is an exploded perspective view of the side molding body and the attachment member according to a third embodiment.
Figure 9:
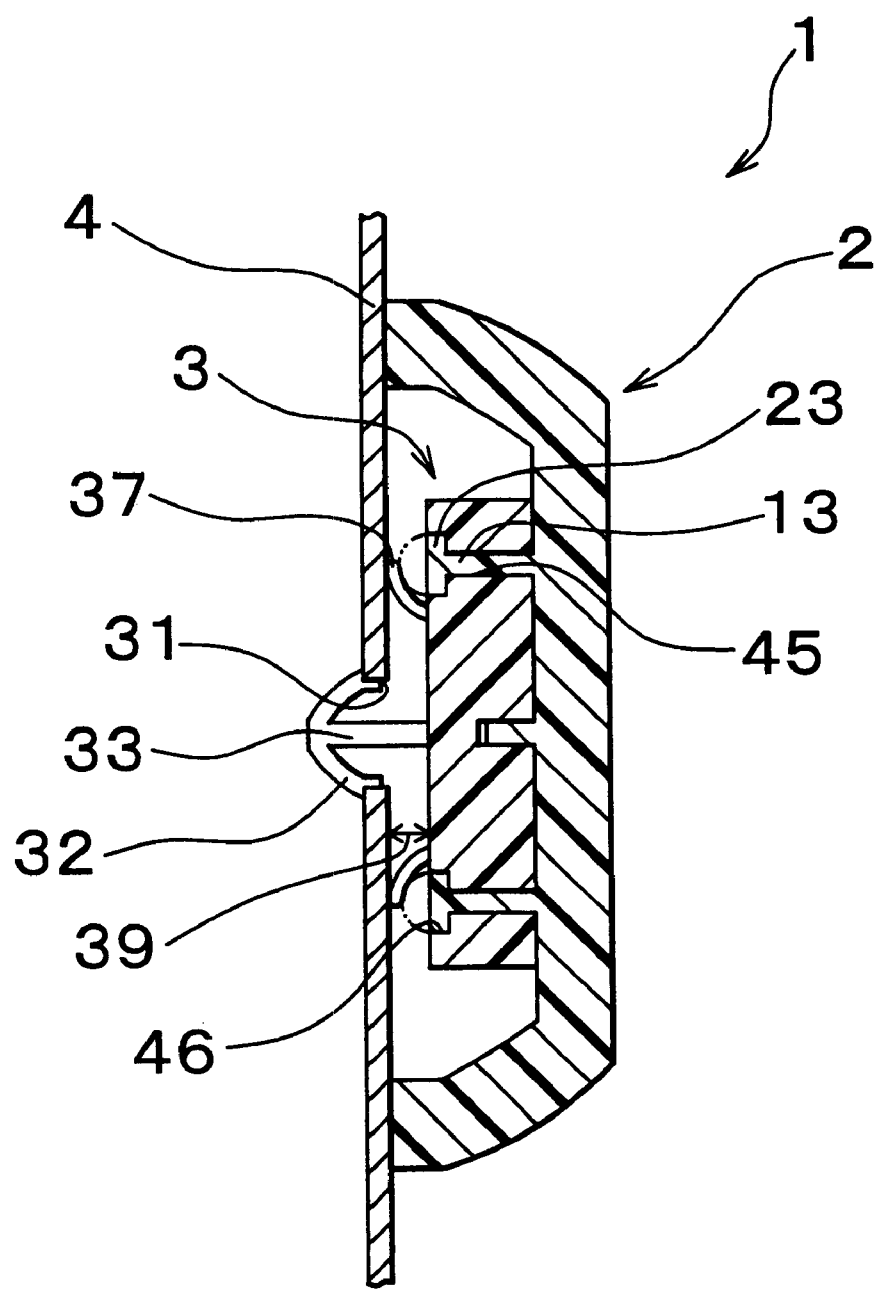
FIG. 9 is a cross sectional view of the vehicle attached with the side molding viewed from the front of the vehicle according to the third embodiment.

The vehicle molding of the third embodiment is basically a combination of the first and the second embodiments. FIG. 8 is an exploded perspective view of the vehicle molding 1 according to the third embodiment viewed from the vehicle advancing direction. The parts or components corresponding to those in FIG. 6 are indicated as the same reference numerals. FIG. 9 is a cross sectional view of the side molding body 2 attached to the body panel 4 viewed from the front side of the vehicle. The parts or components corresponding to those in FIG. 7d are indicated as the same reference numerals.

As shown in FIG. 9, the clearance between the body panel side outer surface of the clip 3 and the body panel 4 is very small. Accordingly, when the heat riveting portion 23 is formed by projecting from the body panel side outer surface, the stroke is difficult to be secured. Therefore, the engagement of the elastic engaging portion 33 with the engaging hole 31 may be difficult. In addition, when the projecting of the heat riveting portion 23 is relatively large, the side molding body 2 may be floating from the body panel 4. Accordingly, in the third embodiment, a bore 46 is formed at the body panel side end portion of the rib hole 45. The heat riveting portion 23 is housed in the bore 46 as is shown in the first embodiment. Therefore, the heat riveting portion 23 is not projected from the body panel side outer surface of the clip 3. Accordingly, in the third embodiment, a sufficient stroke 39 is secured for engaging the elastic engaging portion 33 with the body panel 4. Since the heat riveting portion 23 is housed in the bore 46, it can prevent the floating of the side molding body 2 from the body panel 4 even when the projecting amount of the heat riveting portion 23 is relatively large.

As explained, the side molding and the attachment member are welded by the welding rib and the slit and extends in longitudinal direction the side molding. Accordingly, when the side molding is deformed to be bent in longitudinal direction by the heat, such bending deformation is restricted by the welding portion extending likewise in longitudinal direction.

Welding ribs are provided in longitudinal direction relative to the side molding. The extending direction of the welding ribs is in parallel with the flow direction of the melting resin used by forming the side molding by injection molding. Thus the welding ribs are formed integrally with the side molding by the injection molding method. The welding ribs will restrict the prevention of the flow of the melted resin material.

A pair of reinforcement ribs may be provided along the longitudinal direction of the welding ribs successively at both sides. The above form will effectively restrict the occurrence of the dent upon injection molding and further reinforce the rigidity in longitudinal direction of the side molding.

The heat riveting method may be not restricted to the methods shown in the embodiments. For example, a heat rivet pin is prepared at the inner wall of the side molding and a bore is provided at the attachment member for penetrating the heat rivet pin therethrough. In above method, when the heat rivet pin is inserted from the outer surface of the attachment member into the bore, the heat rivet pin penetrates the bore through and extends out of the reverse side of the attachment member. The penetrated heat rivet pin is heat deformed by being crushed to form a needle head shape heat riveting portion. By this heat riveting portion, the attachment member is prevented from dropping off from the side molding. The above form will restrict the side molding peeling off.

As a modification example, heat riveting rib may be provided on the inner wall of the side molding along the longitudinal direction of the side molding and a slit may be provided on the attachment member for penetrating the rib therethrough.

According to the modification, when the heat riveting rib is inserted into the slit from the outer surface of the attachment member, the heat riveting rib penetrates the slit through and extends out of the reverse side of the attachment member. This projected portion is heat deformed by being crushed to form a straight line bead shape heat riveting portion. The heat riveting portion is provided in longitudinal direction of the side molding. Accordingly, when the side molding is deformed to be bent in longitudinal direction by the heat, such bending deformation is restricted by the heat riveting portion extending in longitudinal direction.

The embodiments of the side molding according to the invention have been described but the invention is not intended to be limited these embodiments. The shape, the arrangement or the number of elastic engaging portion is not limited to those in the embodiments. For example, clip or pin may be used as an elastic engaging portion.

The shape, the arrangement or the number of welding rib or slit is not limited to those in the embodiments. The shape, the arrangement or the number of hook is not limited to those in the embodiments.

The invention can be implemented by any modification or improvement by any person skilled in the art. For example, the position of the side molding may be either at front door panel, a rear door panel, or a fender panel.

As the attachment member, double coated tape or clip may be used. For example, the side molding may be fixed by the attachment member only at the ends and fixed by a double coated tape or clip at the center portion.

What is claimed is:

1. A method for attaching a vehicle molding to a vehicle body, comprising:
    inserting a welding rib provided in a recess of the vehicle molding, and on a side of the vehicle molding facing a body panel of the vehicle body, into a rib hole provided in an attachment member having an engaging portion for engaging with the body panel;
    securing the vehicle molding and the attachment member integrally by heat riveting a tip end of the welding rib projecting from the rib hole; and
    attaching the vehicle molding to the body panel by inserting the engaging portion of the attachment member into an engaging hole opened on the body panel.

2. A method for attaching a vehicle molding to a vehicle body, according to claim 1 wherein the welding rib is formed along the longitudinal direction of the molding body.

3. A method for attaching a vehicle molding to a vehicle body, according to claim 2 wherein the reinforcement rib comprises a plurality of reinforcement ribs located along a longitudinal direction of the vehicle molding.

4. A method for attaching a vehicle molding to a vehicle body, according to claim 2 wherein the molding body includes a reinforcement rib provided in the recess along the longitudinal direction of the molding body.

5. A method for attaching a vehicle molding to a vehicle body, according to claim 4 wherein the welding rib is formed by elevating a portion of the reinforcement rib.

6. A method for attaching a vehicle molding to a vehicle body, according to claim 1 wherein a bore is provided at an opening of the rib hole to which a tip end of the welding rib is projecting.

7. A method for attaching a vehicle molding to a vehicle body, according to claim 1 wherein the tip end of the welding rib is housed inside of the bore subsequent to the heat riveting.

8. A method for attaching a vehicle molding to a vehicle body, according to claim 1 wherein the attachment member includes an engaging portion engaging with the body panel.

9. A method for attaching a vehicle molding to a vehicle body, according to claim 8 wherein the engaging portion is a clip having a spindle shape.

10. A method for attaching a vehicle molding to a vehicle body, according to claim 9 wherein the pawl includes a stepped portion provided at a tip end of the return portion for engaging with a brim of the hole.

11. A method for attaching a vehicle molding to a vehicle body, according to claim 8 wherein the engaging portion includes a pawl having a return portion engaging with the hole opening to the body panel.

12. A method for attaching a vehicle molding to a vehicle body, according to claim 8 wherein the attachment member includes a pushing force generating member which pushes the body panel.

13. A method for attaching a vehicle molding to a vehicle body, according to claim 12 wherein the pushing force generating member is a fin projecting with inclination toward the body panel.

14. A vehicle molding, comprising:
    a molding body with a reinforcement rib and a welding rib extending from the reinforcement rib;
    a clip with a rib hole that mateably engages with the reinforcement rib and the welding rib of the molding body to secure the molding body and the clip, the clip further defining a concave bore defined at an outer surface of the rib hole;
    wherein an end of the welding rib that extends into the concave bore is deformed to engage the clip around an outer periphery of the rib hole.

15. The vehicle molding of claim 14, wherein:
    the molding body further includes at least one additional reinforcement rib and at least one additional welding rib extending therefrom;
    the clip further includes at least one additional rib hole that mateably engages with the at least one additional reinforcement and welding ribs of the molding body to secure the molding body and the clip, the clip further defining at least one additional concave bore defined at an outer surface of the at least one additional rib hole;

wherein an end of the at least one additional welding rib that extends into the at least one additional concave bore is deformed to engage the clip around an outer periphery of the at least one additional rib hole.

16. The vehicle molding of claim 14, wherein the end of the welding rib that extends into the concave bore is deformed and is laterally wider than main body portions of the reinforcement and welding ribs around an entire peripheral end of the molding body adjacent the welding rib.

17. The vehicle molding of claim 16, wherein the end of the welding rib that extends into the concave bore is deformed within the concave bore.

* * * * *